United States Patent [19]

Mattingly et al.

[11] Patent Number: 5,518,104
[45] Date of Patent: May 21, 1996

[54] CONVEYOR TRANSFER

[75] Inventors: James F. Mattingly, Louisville; Ellsworth H. Collins, Mt. Washington; William A. Fultz, Louisville, all of Ky.

[73] Assignee: The Interlake Companies, Inc., Shepherdsville, Ky.

[21] Appl. No.: 354,615

[22] Filed: Dec. 13, 1994

Related U.S. Application Data

[63] Continuation-in-part of Ser. No. 168,474, Dec. 16, 1993, Pat. No. 5,375,696, which is a continuation-in-part of Ser. No. 14,378, Feb. 5, 1993, Pat. No. 5,287,956.

[51] Int. Cl.⁶ .................................................. B65G 47/26
[52] U.S. Cl. ............................................ 198/457; 198/782
[58] Field of Search ................................. 198/457, 782, 198/791

[56] References Cited

U.S. PATENT DOCUMENTS

| | | |
|---|---|---|
| 2,468,925 | 5/1949 | Boer . |
| 3,141,367 | 7/1964 | Keener et al. . |
| 3,243,029 | 3/1966 | Oliver . |
| 3,279,585 | 10/1966 | Shen . |
| 3,370,727 | 2/1968 | Shaw . |
| 3,447,665 | 6/1969 | Egeland et al. . |
| 5,012,914 | 5/1991 | Berends et al. . |
| 5,287,956 | 2/1994 | Collins et al. . |
| 5,375,696 | 12/1994 | Collins et al. . |

*Primary Examiner*—D. Glenn Dayoan
*Attorney, Agent, or Firm*—Wheat, Camoriano, Smith & Beres

[57] ABSTRACT

A modular conveyor system includes modular conveyor units and modular transfer units, which are driven by the driveshafts from adjacent modules. The transfer units include a first driveshaft segment extending below the conveyor frame and first and second multi-direction wheels mounted on the shaft segment such that when the first driveshaft segment rotates, it drives the first wheel in a forward direction and the second wheel in a backward direction, the wheels being independently shiftable relative to the top surface of the conveyor frame so as to either convey a product or not convey a product.

8 Claims, 5 Drawing Sheets

5,518,104

CONVEYOR TRANSFER

This is a continuation-in-part of U.S. Ser. No. 08/168,474, filed Dec. 16, 1993, now U.S. Pat. No. 5,375,696 which is a continuation-in-part of U.S. Ser. No. 08/014,378, filed Feb. 5, 1993, now U.S. Pat. No. 5,287,956, both of which are incorporated herein by reference.

BACKGROUND OF THE INVENTION

In the prior art, various types of diverters and transfer systems have been used in conjunction with conveyors. Because industries are changing so rapidly, there is a trend in the conveyor art to try to make conveyors modular, so they can be readily reconfigured when needs change. Most diverters and transfers are not modular. They are designed to divert or transfer in a given direction, as part of a system, but they cannot readily be reconfigured when the needs of the system change. Some transfers are modular and can be reconfigured, but those transfers require the transfer portion of the conveyor to be driven by a separate drive from that used by the rest of the conveyor. This means that there is additional expense to provide the additional drives. It also means that the direction of transfer does not automatically change when the direction of the drive is changed.

SUMMARY OF THE INVENTION

The present invention provides a modular conveyor system, including a modular transfer unit, which can readily permit the reconfiguration of the conveyor system, and which is driven by the same drive or drives which drive the rest of the conveyor system.

The present invention provides driveshaft-driven wheels which move up or down in order to move into or out of contact with a product.

The present invention uses the same drive mechanism for the conveyor and the transfer stations, greatly reducing the amount of replacement parts that need to be stocked.

DESCRIPTION OF THE PREFERRED EMBODIMENT

Figure 1:
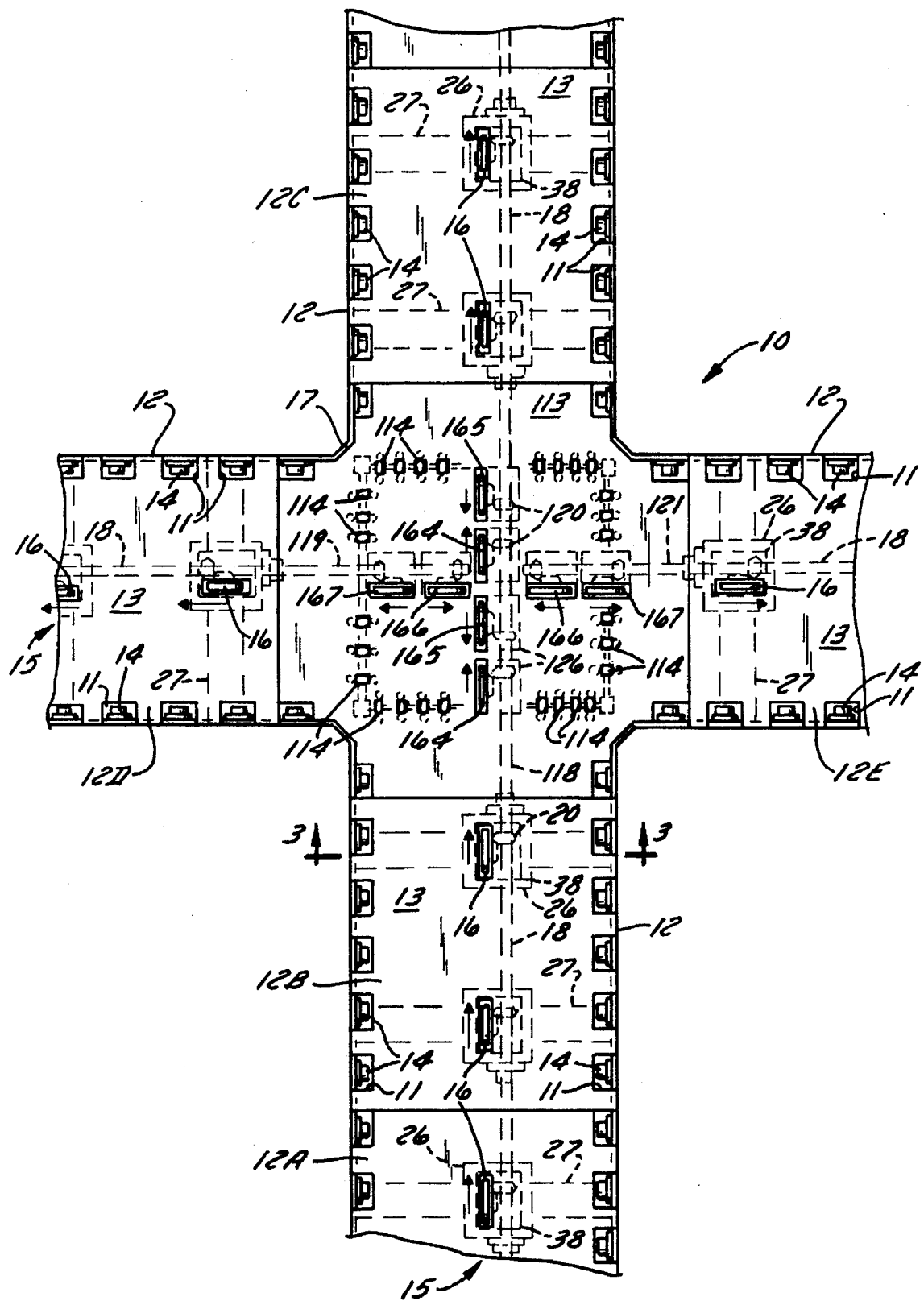
FIG. 1 is a plan view of a modular conveyor system made in accordance with the present invention.

Referring generally to FIGS. 1–9, and looking first at FIG. 1, the conveyor 10 of the preferred embodiment is made up of several modular conveyor units 12 (A–E), each of which includes a top surface 13 with idler wheels 14 on its side edges projecting through openings 11 in the top surface 13, and driven wheels 16 along its centerline. Below each top surface 13 is a driveshaft segment 18, which extends from the front to the back of the modular conveyor unit 12. The driveshafts 18 of adjacent conveyor units 12A and 12B are connected together so that a single drive powers all the modules 12 in a conveyor line 15. The conveyor lines 15 are interconnected by transfer modules 17, which will be described in detail later. While FIG. 1 shows only a single intersection of conveyor lines with a single transfer unit 17, it will be understood that many different conveyor configurations are possible, and that the modules of the conveyor system can be rearranged so that the same set of modules can be used to create several different configurations.

Figure 3:
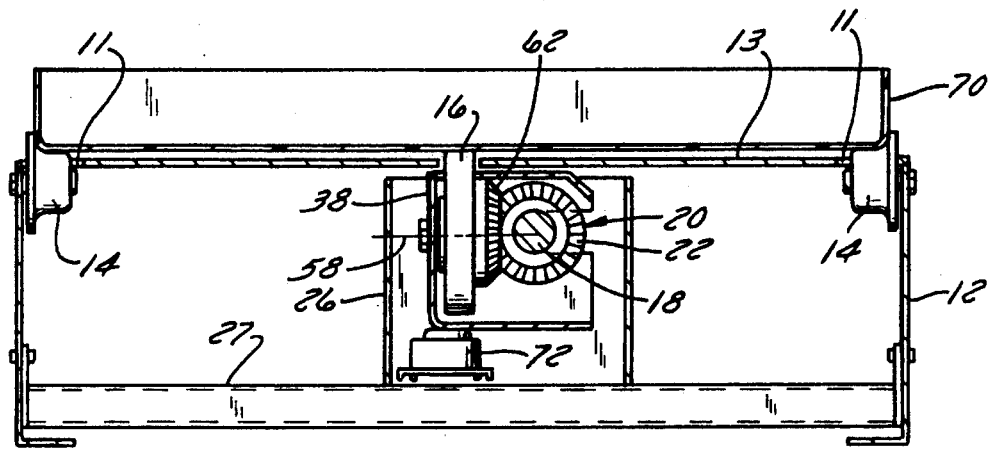
FIG. 3 is a view taken along the section 3—3 of FIG. 1.
Figure 5:
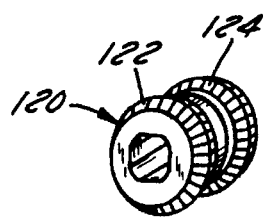
FIG. 5 is a perspective view of one of the drive gears of FIG. 4.
Figure 4:
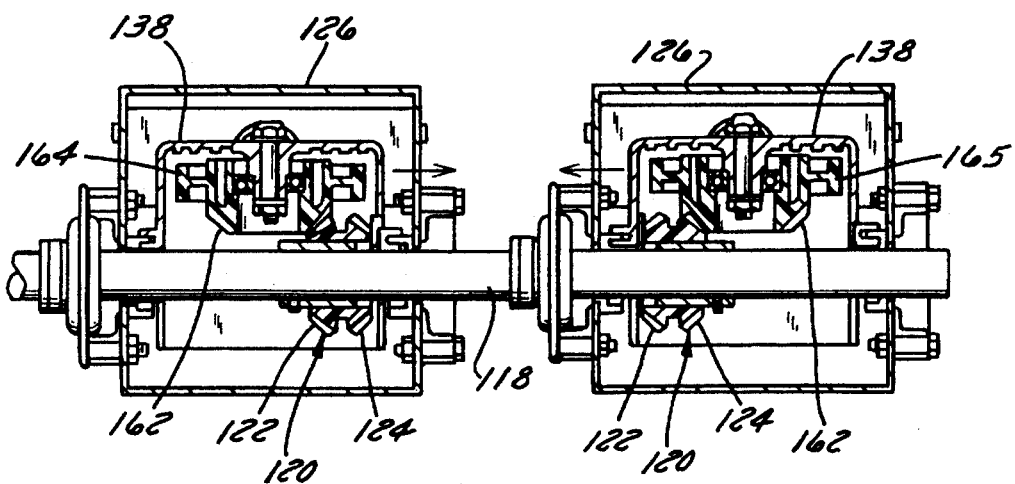
FIG. 4 is a top sectional view of two of the drive wheels in the transfer station of FIG. 1.
Figures 6, 7:
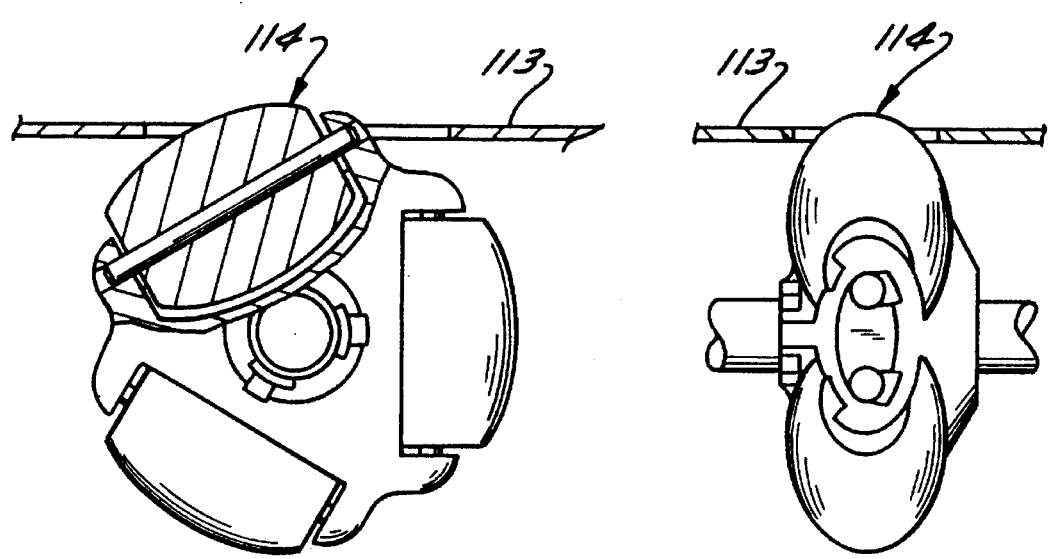
FIG. 6 is a sectional view through a portion of the transfer module of FIG. 1, showing one of the multiple-direction rollers.
FIG. 7 is a view of the multiple-direction roller of FIG. 6 taken perpendicular to the view of FIG. 6.
Figure 8:
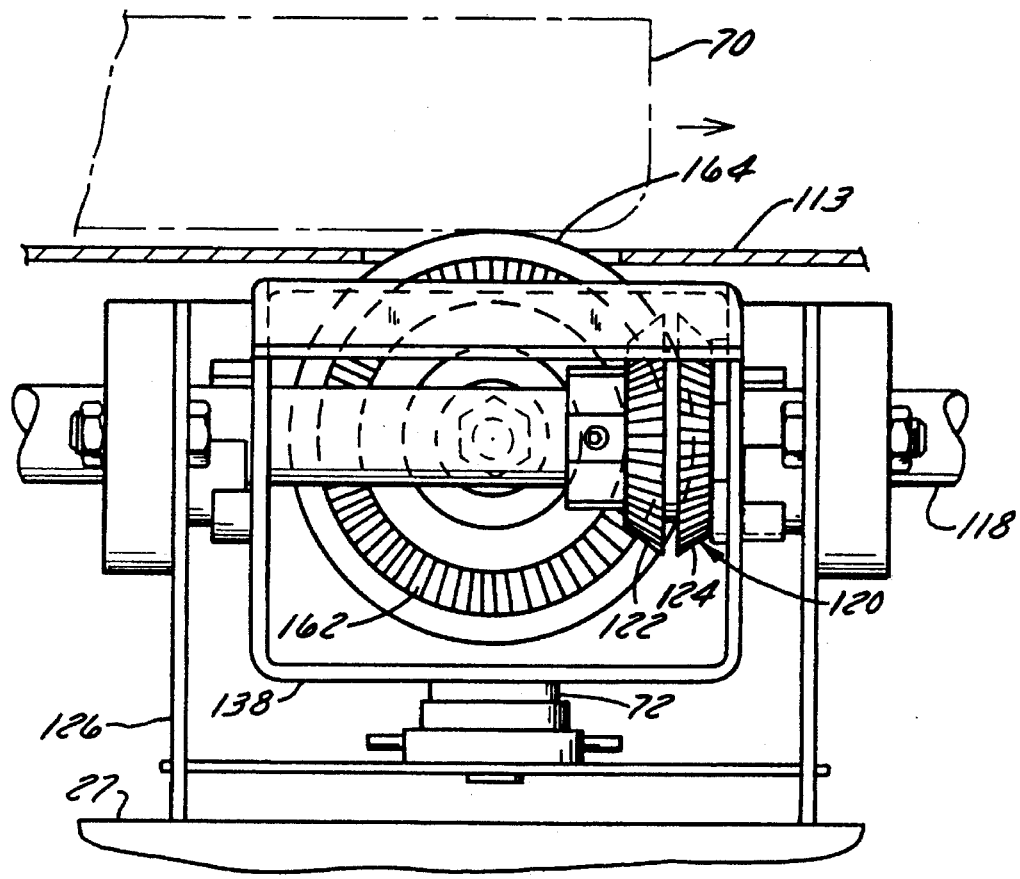
FIG. 8 is a view of one of the drive units in the transfer module of FIG. 1.
Figure 9:
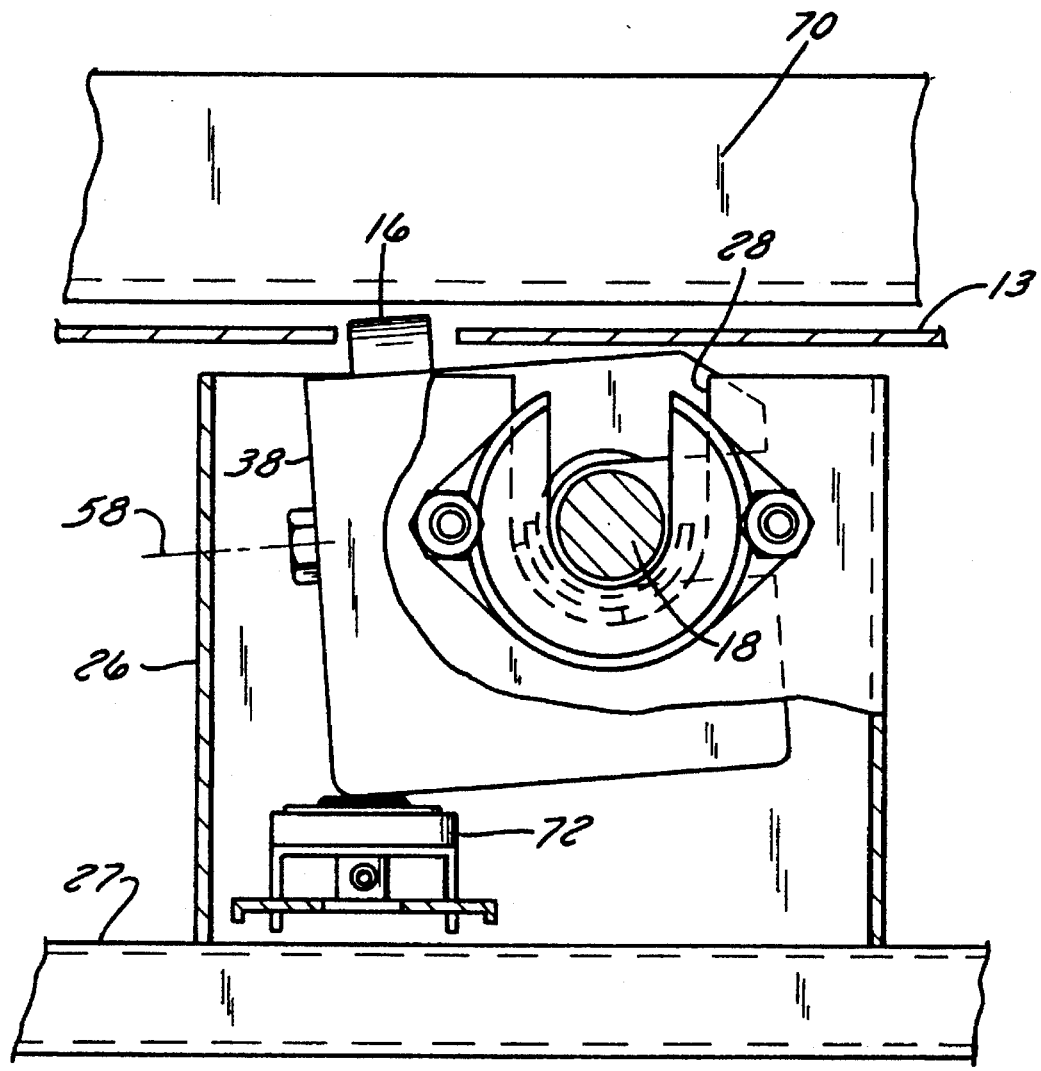
FIG. 9 is an enlarged view of one of the drives in a conveyor module of FIG. 1.

The driven wheels 16 of each conveyor module 12(A–E) are driven from their respective driveshaft segment 18. The details of the drive mechanism are shown in FIGS. 3 and 9. For each driven wheel 16, a drive gear 20 is mounted on the driveshaft segment 18. The drive gear 20 has tapered teeth 22. A similar drive mechanism is described in greater detail in related U.S. Pat. No. 5,287,956.

A bracket 26 is mounted on a base 27, which is mounted to the sides of the module 12, and the bracket 26 defines U-shaped cut-outs 28, through which the driveshaft segment 18 extends. A housing 38 is pivotably mounted on the bracket 26 as described in more detail in U.S. Pat. No. 5,287,956, so as to pivot about the axis of the driveshaft segment 18 without contacting the driveshaft segment 18. On the housing 38 are mounted a driven gear 62 and a drive wheel 16. The driven gear 62 and the drive wheel 16 are coaxially mounted such that, when the driven gear 62 rotates, the drive wheel 16 rotates. The axis 58 of the driven gear 62 and of the drive wheel 16 is substantially perpendicular to the axis of the driveshaft segment 18. When the housing 38 is mounted on the bracket 26, the drive gear 20 and driven gear 62 are meshed, so that, whenever the driveshaft segment 18 rotates, it causes the drive wheel 16 to rotate.

The housings 38 can be pivoted up and down so that, when the drive wheels 16 project above the top surface 13 and contact products (which may be trays or pallets carrying products as shown in FIG. 3), they will drive the products, and, if they are pivoted downward, out of contact with the products, as shown in FIG. 9, they will not drive the products. This is desirable if the conveyor is to be used to accumulate products. As shown in FIG. 3, the tray 70 is supported on the idler wheels 14 on the sides and driven by drive wheels 16 in the center. The pivoting of the housings 38 can be accomplished by using a piston-cylinder arrangement, an air bag, or other known actuators. The use of a piston-cylinder arrangement 72 is shown in these drawings.

The transfer modules 17 are similar to the conveyor modules 12 in many respects, but they also differ from the conveyor modules in several respects. Looking first at FIG. 1, the driveshaft segment 18 of conveyor module 12B is connected to the driveshaft segment 118 of the transfer module 17, which, in turn, is connected to driveshaft segment 18 of conveyor module 12C. Each transfer module 17 has a plurality of multi-directional idler wheels 114 around its perimeter. These multi-directional idler wheels 114 allow products to pass over the top surface 113 of the transfer module 17 in any direction. The multi-directional idler wheels are shown in more detail in FIGS. 6 and 7. The particular multi-directional idler wheels shown here are sold by Interroll under the name Omniwheel. However, other multiple-direction idler wheels could be used instead. Each transfer module 17 has a first driveshaft segment 118, which extends below the top surface 113 of the module 17 from front to back. As with the conveyor module 12, drive gears 120 on the driveshaft segment 118 cause drive wheels 164, 165 to rotate. First drive wheels 164 drive in a forward direction, and second drive wheels 165 drive in a backward direction. Looking at FIGS. 4 and 8, the transfer module drive wheels 164, 165 each are mounted on a housing 138, which pivots on a bracket 126 mounted to the transfer module frame. The housings 138 pivot about the axis of their respective driveshaft segment 118. A driven gear 162 mounted on the housing 138 meshes with its respective drive gear 120 in order to drive the driven gear 162 and drive wheel 164 or 165.

One difference between the transfer module 17 and the conveyor module 12 is that the drive gears 120 in the transfer module 17 have both a forward face 122 and a backward face 124. The direction a drive wheel will rotate is determined by which side of the drive gear 120 is meshed with the respective driven gear 162. If the driven gear 162 is mounted forward of the drive gear 120, it will mesh with the forward face 122 of the drive gear 120, which will cause the driven gear 162 to rotate in the forward direction, when the driveshaft 118 rotates in a counter-clockwise direction, as shown on the left of FIG. 4, so the drive wheel 164 associated with that driven gear 162 will be a forwardly-rotating drive wheel 164. If the driven gear 162 is mounted to the rear of the drive gear 120, as shown on the right of FIG. 4, it will mesh with the rear face 124 of the drive gear 120, so it will rotate in the opposite direction, and the drive wheel 165 associated with that driven gear 162 will drive backward when the driveshaft rotates in a counter-clockwise direction. The directions of rotation of the parts are shown more clearly in FIG. 2.

Figure 2:
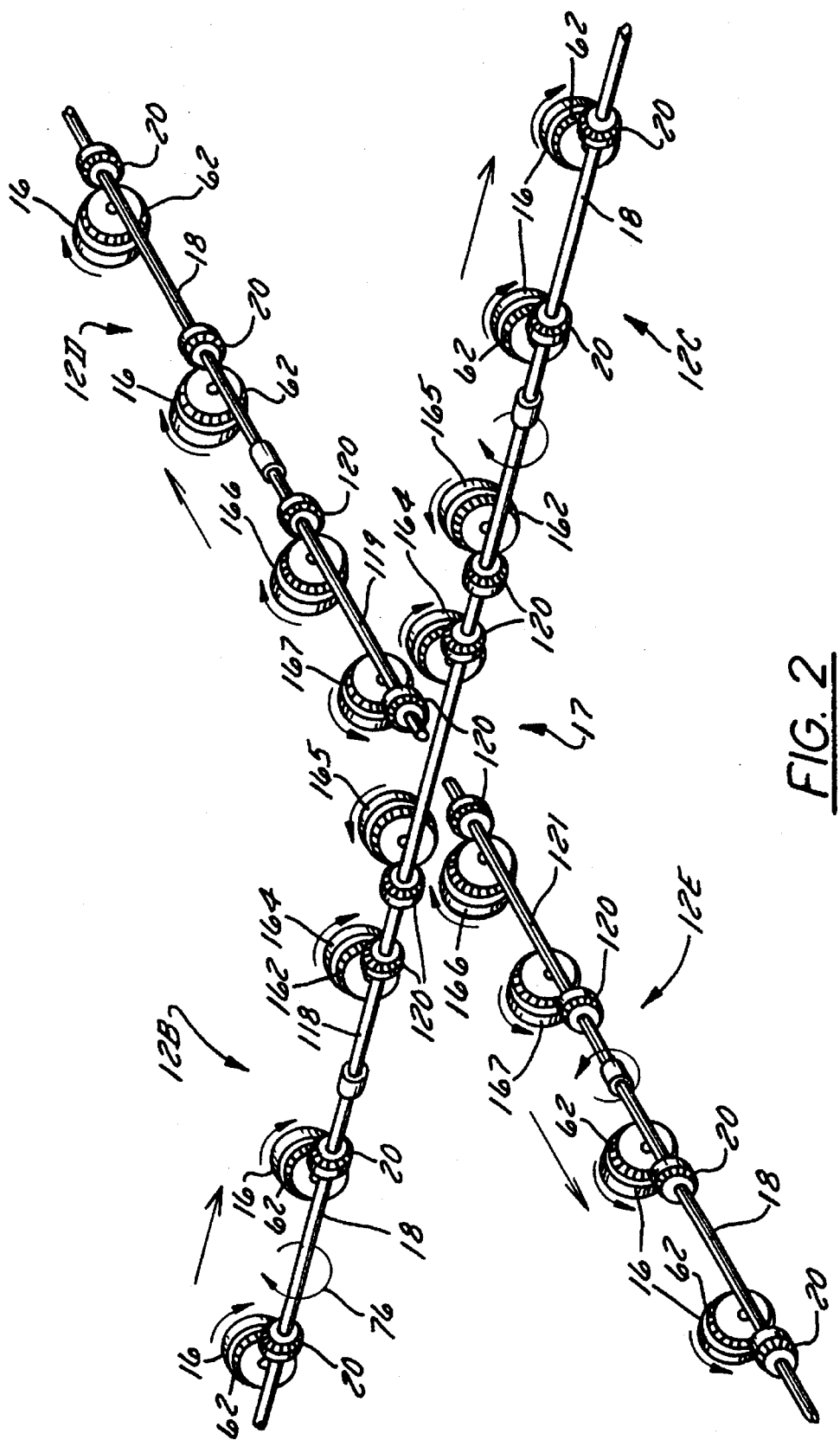
FIG. 2 is a schematic perspective view of the drive portion of the conveyor system of FIG. 1.

As shown in FIG. 2, any time the first driveshaft segment 118 of the transfer station 17 rotates in a counterclockwise direction as shown by the arrow 76, it causes two first drive wheels 164 to rotate in a first direction and two second drive wheels 165 to rotate in the opposite direction. The first driveshaft segment 118 of the transfer module 17 is connected to the driveshaft segment 18 of the adjacent conveyor module 12B, so that the same drive which powers the conveyor line 15 also powers the forward 164 and rearward 165 drive wheels 164, 165 on the transfer unit 17 and the drive of the conveyor unit 12C. The transfer module housings 138 on which the drive wheels 164, 165 are mounted can pivot about the first driveshaft 118, so that the drive wheels 164, 165 can pivot into and out of driving position. No more than one direction of drive wheels will be in the driving position at any given time.

The transfer module 17 also has a second driveshaft 119 and a third driveshaft 121, which extend transverse to the first driveshaft 118. The second and third driveshafts 119, 121 each project from one side of the module 17 toward the middle of the module 17. Since all the driveshafts 118, 119, 121 are at the same height, they cannot readily cross in the middle of the module 17. The second driveshaft 119 is powered by another driveshaft segment in the module 12D, to the left of the transfer module 17, and the third driveshaft 121 is powered by the driveshaft segment 18 in the module 12E, to the right of the transfer module 17.

The second and third driveshafts 119, 121 power third drive wheels 166 and fourth drive wheels 167. The third drive wheels 166 rotate opposite to the direction of the fourth drive wheels 167 and are mounted relative to their respective driveshafts 119, 121 in the same manner as the first and second drive wheels 164, 165 are mounted relative to their driveshaft 118.

The operation of the conveyor system is as follows:

All the driveshafts are driven by their respective drives (not shown). In the arrangement shown in FIG. 1, there would be three drives—one for the conveyor modules 12A, B, and C and the forward and rear-driving transfer wheels 164, 165; one for the conveyor module 12D and the wheels 166, 167 on the left of the shaft 118; and one for the conveyor module 12E and the transfer wheels 166, 167 on the right of the shaft 118. This means that all the drive wheels on the conveyor units 12(A–E) and the transfer unit 17 are also driven. The drive wheels 16 on the conveyor modules 12(A–E) are all in the "up" position, so they will convey any product that comes along. The conveyor modules 12A, 12B, and 12C convey products in the forward direction; the module 12D conveys products to the left; and the module 12E conveys products to the right.

As the first product reaches the transfer module 17, the central controller selectively sets the first, second, third and fourth drive wheels 164, 165, 166, and 167 in the raised or lowered position, depending upon the direction in which the product is to be transferred. If the product is to go to the left, the third drive wheels 166, which are rotating to the left, would be in the "up" position, and all the other drive wheels on the transfer module would be in the "down" position. If the product is to go to the right, only the fourth drive wheels 167 would be in the "up" position on the transfer module, and, if the product is to go forward, only the first drive wheels 164 would be "up" on the transfer module. With the conveyor 10 set up as shown in FIG. 1, there would not be a need for the second drive wheels 165 to drive a product in the backward direction, because there is no conveyor connected to the transfer station 17 which would carry products in the backward direction. In that case, the second drive wheels might also be mounted to drive in the forward direction. However, the purpose of this discussion is to show that all four directions of drive are possible in the embodiment of the transfer module 17 shown here.

The conveyor modules 12 and transfer modules 17 are designed so that the parts which are likely to wear out are on the pivot housings 38 and 138. Since these pivot housings are identical to each other, stocking a single pivot housing will supply the needed repair parts to keep the conveyor system operating. To remove and replace a pivot housing 38, 138, all that is needed is to pivot the housing 38 or 138 until it comes free from the bracket 26 or 126, lift the pivot housing out, and then install the replacement following the same steps but in reverse. The replacement of wear parts is therefore very simple and can be done very quickly, so the conveyor does not have to be shut down for a lengthy maintenance period.

If the conveyor needs to be reconfigured, the modular conveyor units 12 and transfer units 17 can be moved and put into any desired configuration, connecting the respective adjacent driveshaft segments 18, 118, 119, 121 so that drives at the ends of the driveshafts can drive several driveshaft segments. Controls are connected to the actuator 72 for each pivot housing 38, 138, so the housings can be shifted up and down for moving into and out of driving contact with the products.

It will be obvious to those skilled in the art that modifications may be made to the embodiment described above without departing from the scope of the present invention.

What is claimed is:

1. A conveyor transfer, comprising:

a frame having a top surface which has a perimeter and defines forward, backward, left, and right directions;

a plurality of multi-directional wheels located around the perimeter of said top surface so as to support products entering and leaving said top surface from multiple directions;

a first drive shaft segment extending below said frame; and first and second wheels mounted such that, when said first driveshaft segment rotates, it drives said first wheel in a forward direction and said second wheel in a backward direction, said first and second wheels being independently shiftable relative to said top surface, such that they can be shifted up in order to convey a product and down in order not to convey a product.

2. A conveyor transfer as recited in claim 1, and further comprising:

a second driveshaft segment extending below said frame substantially perpendicular to said first driveshaft segment;

third and fourth wheels mounted such that, when said second driveshaft segment rotates, it drives said third wheel to the left and said fourth wheel to the right, said third and fourth wheels being independently shiftable relative to said top surface, such that they can be shifted up in order to convey a product and down in order not to convey a product.

3. A conveyor transfer as recited in claim 1, and further comprising first and second drive gears on said first driveshaft segment, said first and second drive gears driving said first and second wheels, respectively.

4. A conveyor transfer as recited in claim 1, wherein said first and second wheels shift up and down by pivoting about the axis of the first driveshaft segment.

5. A conveyor transfer as recited in claim 1, and further, comprising:

a plurality of conveyor modules connected to said conveyor transfer to form a conveyor system; said conveyor modules each including a conveyor driveshaft segment; wherein the conveyor driveshaft segments of said conveyor modules are connected to the respective adjacent driveshaft segments of said transfer.

6. A conveyor transfer, comprising:

a frame having a top surface which defines forward, backward, left, and right sides;

a first drive shaft segment extending below said frame in the forward-to-backward direction at a first height and extending to a position below one of said forward and backward sides such that it can be connected to and driven by another drive shaft;

a second drive shaft segment extending below said frame in the left-to-right direction, also at said first height and extending to a position below one of said left and right sides such that it can be connected to and driven by another drive shaft;

a wheel driven from said first drive shaft segment; and a wheel driven from said second drive shaft segment;

said wheels being independently shiftable relative to said top surface, such that they can be shifted up in order to convey a product and down in order not to convey a product.

7. A conveyor transfer as recited in claim 6, and further comprising: a plurality of wheels driven from said first drive shaft segment, and a plurality of wheels driven from said second drive shaft segment.

8. A conveyor transfer, comprising:

a frame having a top surface which has a perimeter and defines forward, backward, left, and right directions;

a first drive shaft segment extending below said frame; and first and second wheels mounted such that, when said first driveshaft segment rotates, it drives said first wheel in a forward direction and said second wheel in a backward direction, said first and second wheels being independently shiftable relative to said top surface, such that they can be shifted up in order to convey a product and down in order not to convey a product.

\* \* \* \* \*